United States Patent
Kubasta

[15] 3,659,877
[45] May 2, 1972

[54] BREAKAWAY PIPE COUPLING
[72] Inventor: James W. Kubasta, Metairie, La.
[73] Assignee: Shell Oil Company, New York, N.Y.
[22] Filed: Sept. 11, 1970
[21] Appl. No.: 71,528

[52] U.S. Cl..................................285/3, 285/368, 285/412
[51] Int. Cl..........................................................F16l 35/00
[58] Field of Search.....................285/2, 3, 4, 368, 356, 387, 285/412

[56] References Cited

UNITED STATES PATENTS

| | | | |
|---|---|---|---|
| 1,309,146 | 7/1919 | Mann | 285/368 |
| 2,083,054 | 6/1937 | Cline | 285/2 |
| 1,869,915 | 8/1932 | Sample | 285/356 X |
| 602,378 | 4/1898 | Thomson | 285/2 |
| 1,525,647 | 2/1925 | Haughey | 285/368 X |
| 925,770 | 6/1909 | Herrick | 285/368 |
| 2,831,708 | 4/1958 | Kircher | 285/368 |
| 2,712,438 | 7/1955 | Brown, Jr. | 285/368 X |
| 3,410,995 | 11/1968 | Gray | 285/2 X |

Primary Examiner—Andrew V. Kundrat
Attorney—George G. Pritzker and Harold L. Denkler

[57] ABSTRACT

A breakaway pipe coupling for coupling a pipeline together comprising a pair of telescopingly engaged upper and lower tubular coupling members adapted to be connected to a pipeline and including a pair of flanges surrounding the members for holding them in fixed relationship, one flange being secured to the upper coupling member and a split flange surrounding but not secured to the lower coupling member. Frangible bolts secure the upper flange portion to the split flange with the split flange adapted to separate when undue stress is placed on the coupling members and breaks the frangible bolts.

9 Claims, 3 Drawing Figures

Patented May 2, 1972
3,659,877
2 Sheets-Sheet 1
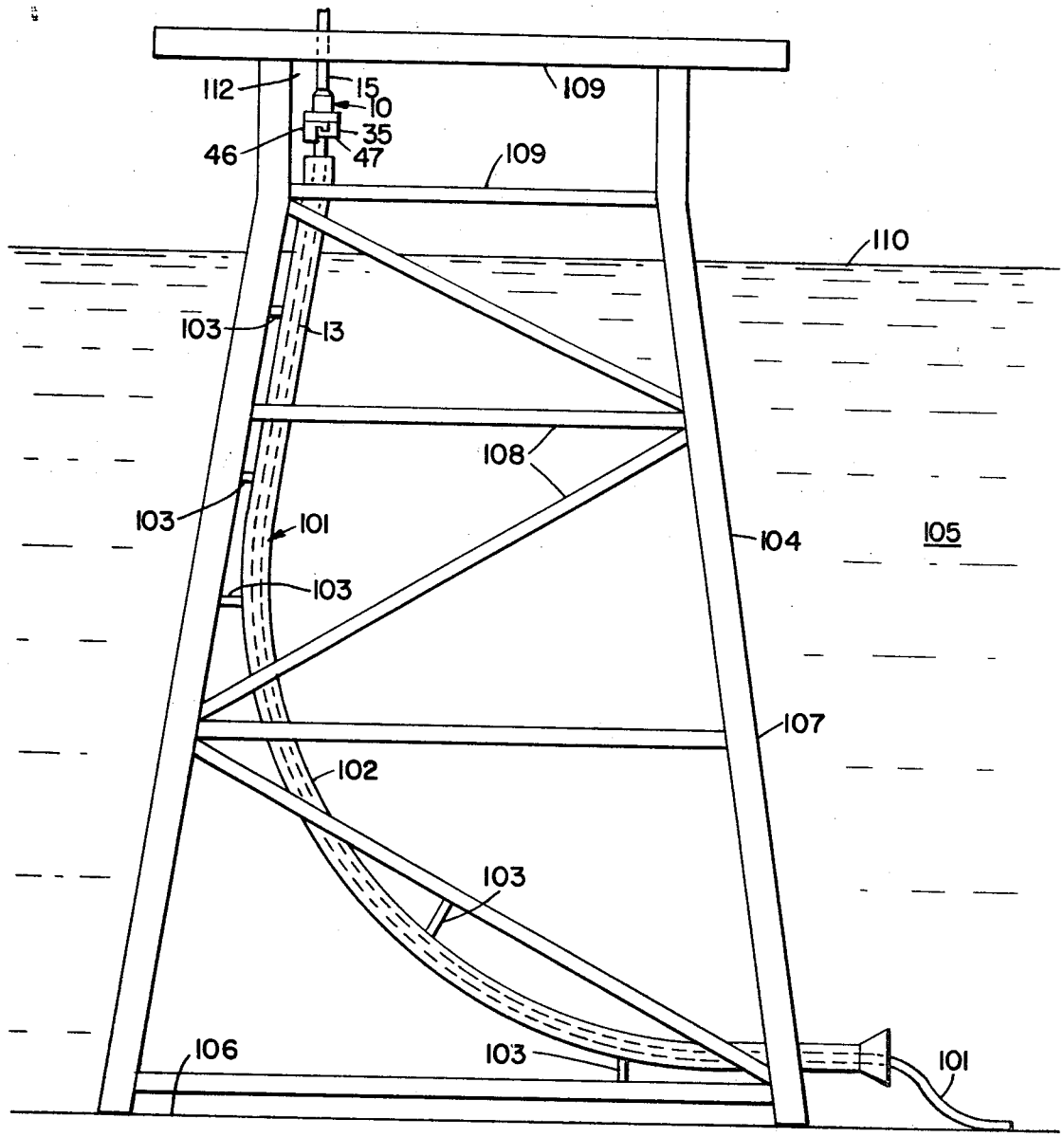
FIG_1
INVENTOR.
JAMES W. KUBASTA
BY
Harold L. Dinkler
ATTORNEY

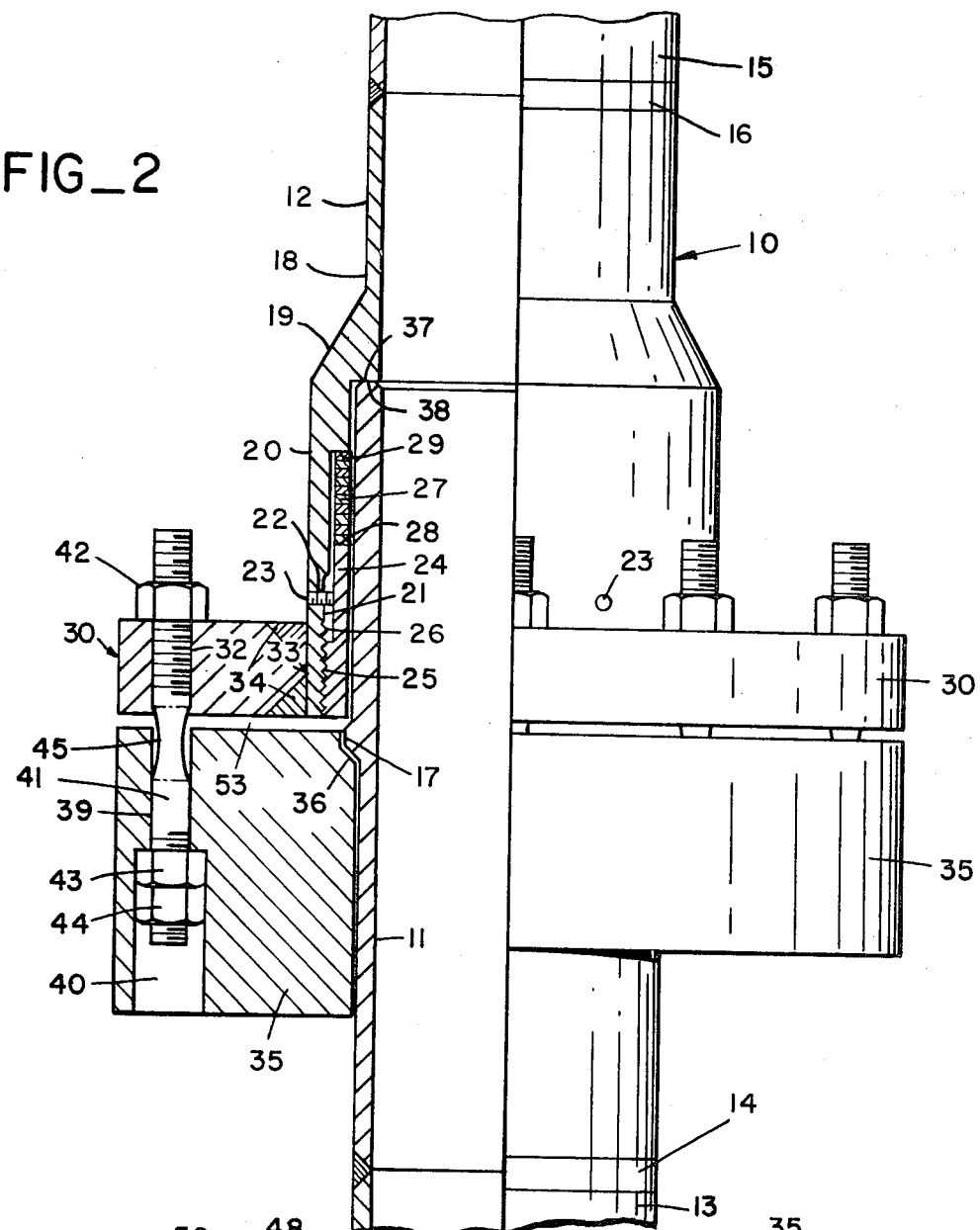
FIG_2
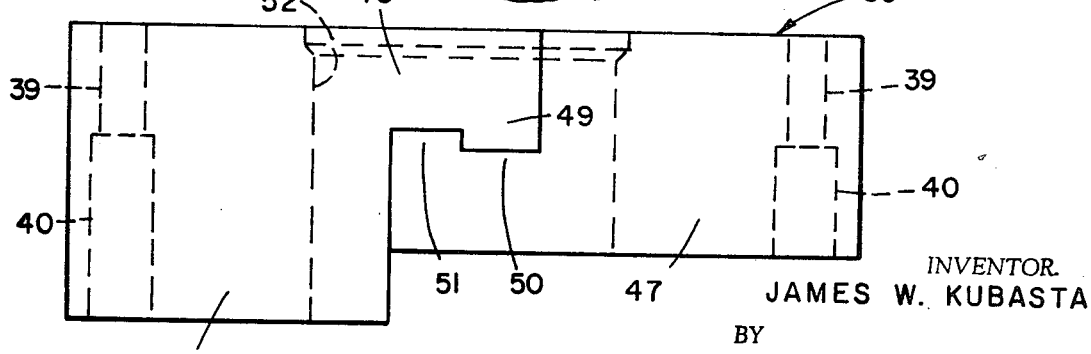
FIG_3
INVENTOR.
JAMES W. KUBASTA
BY
Harold L. Stinkler
ATTORNEY

BREAKAWAY PIPE COUPLING

BACKGROUND OF THE INVENTION

1. Field of the Invention

The invention relates to pipe couplings; and, more particularly, to a breakaway pipeline coupling which is adapted to separate and fall off the pipe when undue stress is placed thereon.

2. Description of the Prior Art

It is well known that a pair of pipelines may be coupled together in a fluid-tight manner by means of couplings or the like. Such couplings generally involve providing flanges or the like on each pipeline, then securing the flanges together.

However, such procedures have proven unsatisfactory where the cost of equipment associated with the pipeline is relatively high with respect to the pipeline or couplings themselves and when the pipelines are subjected to external stresses, such as when laid underwater. For example, should undue stress be placed on the pipeline, equipment will be damaged until the pipelines separate. Thus, a pipeline coupling assembly is required that will part before other, and possibly more expensive, apparatus connected to the pipeline fails.

SUMMARY OF THE INVENTION

It is an object of this invention to provide a pipe coupling which is adapted to break when subject to undue stress.

It is a further object of this invention to provide a bolted flange for joining the coupling whereby, when subject to undue stress, the bolts will separate and the flange can fall off the pipe coupling permitting the pipe to pass through a conduit of smaller internal diameter than the outer diameter of the flange and without damaging equipment associated with one or both ends of the pipeline.

These and other objects are preferably accomplished by providing a pair of telescopingly engaged upper and lower tubular coupling members adapted to be connected to a pipeline and a pair of upper and lower flanges surrounding the couplings for holding them in fixed relationship, the upper flange being secured to the upper coupling member and a split flange surrounding the lower coupling member. Frangible bolts secure the upper flange portion to the split flange with the split flange adapted to separate and fall off the coupling when undue stress is placed on the coupling members. This coupling may be placed immediately above an underwater pipeline riser conduit. The split lower flange will allow the parted pipeline coupling to move through the conduit should it be pulled by some foreign object at the sea floor.

BRIEF DESCRIPTION OF THE DRAWING

FIG. 1 is a vertical view of one possible installation of a pipeline coupling in accordance with the teaching of my invention;

FIG. 2 is a vertical, partly sectional view of the pipe coupling; and

FIG. 3 is a full elevational view of the split flange of the coupling of FIG. 2.

DESCRIPTION OF THE PREFERRED EMBODIMENT

Referring now to FIG. 1 of the drawing, a pipeline 101 as shown having been pulled through a conduit 102. The conduit 102 is shown rigidly braced at bracer 103 internal to an offshore platform 104 sitting in a body of water 105 and resting on or secured to the ocean floor 106. The platform consists of suitable leg members 107 and braces 108 with one or more working decks 109 above the water surface 110. A breakaway coupling 10 is shown installed in the pipeline 101 above the riser conduit 102. The section 15 of the pipeline above the coupling 10 is rigidly connected at brace 112 to the platform 104. The lower section 13 of the pipeline below the coupling 10 passes through the conduit 102 but is not secured to it. Thus, when an external force such as from shifting soils on the ocean bottom 106 or from a boat anchor (not shown) is applied to pipeline 101, the coupling 10 will part and the split flange 35, as will be discussed further hereinbelow, will be pulled down with the lower section 13 of the pipeline 101 until the thick section 46 of the split flange 35 contacts the top of the conduit 102. The jolt from this impact will cause the thin section 47 of the split flange 35 to continue falling such that it will unkey itself from the thick section 46 and both halves 46 and 47 of the split flange 35 may then fall off coupling 10 permitting the lower section 13 pipeline 101 to continue passing through conduit 102. This will remove the loading from the conduit bracing 103 which had been transmitted into the platform bracing 108 thus subjecting them to potential failure.

Referring now to FIG. 2 of the drawing, pipe coupling 10 is shown in detail as having a lower generally tubular hollow male coupling member 11 telescopingly fitting into an upper generally tubular hollow female coupling member 12. Coupling member 11 is adapted to be secured to the lower section 13 of the pipeline 101, as by welding 14, whereas coupling member 12 is adapted to be secured to the upper section 15 of pipeline 101, as by welding 16. In this manner, fluids may be flown within section 13 of pipeline 101 past coupling 10 and through section 15, or vice versa.

Preferably, as shown in FIG. 2, lower coupling member 11 includes bearing means extending about its outer surface, such as raised annular ring 17, for reasons to be discussed further hereinbelow. Upper coupling member 12 preferably includes a first generally vertical portion 18 of an inner diameter approximately the same as the inner diameter of lower coupling member 11 and pipeline sections 13 and 15. Portion 18 then extends generally downwardly and outwardly, as at second portion 19, then downwardly substantially vertically to form a third portion 20. Portion 20 forms an annular space 21 between it and the outer wall of lower coupling member 11. One or more apertures 22 are formed in portion 20 for receiving set screws 23 or the like therein for securing retainer ring 24 for reasons to be discussed further hereinbelow. These set screws may be disposed about the outer surface of portion 20, as for example, every 120° or so.

The substantially cylindrical retainer ring 24 is disposed in annular space 21, the ring 24 having threads 25 or the like at its lower end adapted to engage threads 26 on the lower end of the third portion 20 of upper coupling member 12. Set screws 23 in portion 20 thus contact retainer ring 24 and secure it from being screwed out. Sealing means, such as a plurality of spacer or packing rings 27 are disposed above the upper surface 28 of retainer ring 24 and below an abutment surface 29 on third portion 20 extending inwardly therefrom generally horizontally toward the central longitudinal axis of pipe coupling 10. In this manner, with threads 25 and 26 engaged and set screws 23 tightened against ring 24, a fluid-tight seal is formed between the engagement of lower and upper coupling members 11 and 12.

An upper flange member 30 is provided encircling the upper coupling member 12. Flange member 30 includes a plurality of apertures 32 extending therethrough, only one being shown in FIG. 1 for convenience of illustration. At its point of engagement with the third portion 20 of the upper coupling member 12, flange portion 30 preferably is beveled to point 33. Upper flange member 30 may then be secured to third portion 20 by welding in the spaces 34 formed above and below point 33 as shown in FIG. 1. In this manner, the upper flange member 30 is fixedly secured to the upper coupling member 12.

Furthermore, a lower split flange portion 35 (see also FIG. 3) is provided encircling the lower coupling member 11. Flange portion 35 includes a bearing surface 36 thereon at its point of engagement with lower coupling member 11, the surface 36 conforming to ring 17 in a manner such that movement downward of ring 17 is prevented by surface 36. In this manner, also, that is, by means of the engagement of surface 38 and the face 37 of portion 20, a space 53 is formed between the upper and lower flange portions 30 and 35 as can be seen in FIG. 2.

A plurality of apertures 39 are formed in lower flange portion 35 similar to and aligned with apertures 32 on upper flange portion 30. Apertures 39 preferably include enlarged aperture portions 40 for receiving one or more nuts or the like. Thus, securing means are provided between upper and lower flange portions 30 and 35 by extending bolts 41 or the like through apertures 32 and 39. Bolts 41 are preferably threaded at each end so as to receive a lock nut 42 at one end and a jam nut 43 and lock nut 44 at the other end. As can be seen in FIG. 1, jam and lock nuts 43 and 44 are disposed in aperture portion 40 on lower flange portion 35. However, obviously similar arrangements may be provided for fastening together the upper and lower flange portions 30 and 35. However, in whatever arrangement is used, the bolt 41 or the like must be frangible in the manner to be discussed further hereinbelow.

Thus, bolt 41 preferably includes a central reduced portion 45 which is adapted to part when undue stress is put thereon. For example, 12-inch bolts of titanium or the like may be used with the bolts having a thickness at its greatest shaft diameter of approximately 1 inch and a reduced neck at portion 45 of approximately three-quarters of an inch. Regardless of the materials or dimensions used, bolts 41 are designed to part at a predetermined load.

Referring now to FIG. 3, the split flange portion 35 is shown in detail. Split flange portion 35 comprises a pair of half-rings 46 and 47, one of the rings, such as ring 46, being substantially thicker in cross-section than the other. Ring 46 also includes a generally horizontally extending portion 48 having a generally downwardly extending lip portion 49 adapted to mate with a like generally horizontally extending portion 50 and generally upwardly extending lip portion 51 thereon in the manner illustrated in FIG. 3. Thus, the abutting engagement of lip portions 49 and 51 prohibits lateral separation of rings 46 and 47 while permitting downward movement and separation thereof. An aperture 52 (shown in dotted lines) is formed by the mating engagement of rings 46 and 47 for receiving lower coupling member 11 therein.

In operation, the packing rings 27 are inserted into upper coupling 12. The retainer ring 24 is then made up by means of threads 25 and 26 in upper coupling 12 and the set screws 23 are tightened to prevent retainer ring 24 from backing off. Lower coupling 11 is then inserted into upper coupling 12 containing packing rings 27 which provide a fluid-tight seal between coupling members 11 and 12. The upper flange member 30 is disposed about portion 20 on upper coupling member 12 and welded thereto, as in spaces 34 adjacent to point 33 and the lower end of portion 20. In this manner, flange portion 30 is fixed to the upper coupling member 12.

The lower flange portion 35, which includes mating half-rings 46 and 47, is now disposed about the lower coupling member 11. The ring 17 on member 11 contacts surface 36 on split flange 35 while surface 38 of member 11 contacts surface 37 of member 12. Frangible bolts 41 are now placed in the aligned apertures 32 and 39 in upper and lower flange portions 30 and 35, respectively. Lock nuts 42 are secured to the upper ends of bolts 41 and jam nuts 43 and lock nuts 44 are secured to the lower end of bolts 41, nuts 43 and 44 being located in the aperture portions 40 of split flange portion 35.

Pipeline sections 13 and 15 are now secured to the free ends of lower coupling member 11 and upper coupling member 12, respectively.

It is to be understood that pipeline sections 13 and 15 are coupled to suitable equipment associated with such pipeline sections. Should undue stress be placed on section pipeline 13, such stress will be transmitted to coupling 10. In order to prevent damage to other and possibly more expensive equipment associated with pipeline sections 13 and 15, bolts 41 part at their reduced portions 45 and the half-rings 46 and 47 of lower split flange portion 35 separate. Flange portion 35, now no longer attached to the upper flange portion 31, drops off and lower coupling member 11 separates from upper coupling member 12. The pipeline section 13, now separated from pipeline section 15 and having only lower coupling member 11 attached thereto, may pass without damage through other equipment associated with pipeline sections 13 and 15, as for example, a pipeline riser conduit or the like associated with the laying of pipelines underwater as shown in FIG. 1.

Thus, although the invention has been described as applicable to the coupling of any pipelines, it is particularly applicable to the laying of pipelines underwater where the pipelines are subjected to undue stresses from unstable soil conditions or anchors from large marine vessels.

I claim as my invention:

1. A breakaway pipe coupling for coupling a pipeline together comprising:

a first longitudinally extending open-ended generally tubular coupling member having a bearing ring thereon;

a second longitudinally extending open-ended generally tubular coupling member telescopingly fitting over one of the ends of said first coupling member and including sealing means thereon for maintaining said coupling members in fluid-tight relationship;

flange means surrounding said first and second coupling means for holding said first and second coupling members in fixed relationship;

said flange means including an upper flange portion encircling said second coupling member and secured thereto and a mating lower flange portion encircling said first coupling member;

said lower flange portion comprising a pair of split ring portions having interlocking engagement means disposed on the abutting end portions of said pair of split rings, said engagement means preventing lateral movement of said split rings while permitting axial disengagement of said split rings;

said pair of split rings in addition having a bearing surface formed thereon and disposed to engage the bearing ring on said first coupling means to prevent axial movement of said first coupling means in at least one direction;

one of said ring members in addition having a greater axial thickness than the other of said ring members, said difference in thickness being sufficient to permit said engagement means to be disengaged when said one ring member contacts an axial stop; and frangible securing means connected to each of said flange portions for securing said flange portions together until the frangible limit of said securing means is reached whereby said engagement means on said ring members may be disengaged and said ring members separate and drop off of said first coupling member.

2. The coupling of claim 1 wherein said bearing ring is a rib extending circumferentially of said first coupling member.

3. The coupling of claim 1 wherein said second coupling member includes a downwardly extending offset portion thereon and said first coupling member telescopingly fits into said offset portion in a manner forming an annular space between said offset portion and said first coupling member, said offset portion being threaded on a threaded portion thereof internally of said second coupling member; and said sealing means includes an annular ring disposed in said annular space in threading engagement with said threaded portion, said sealing means further including packing means disposed between said annular ring and both said coupling members for sealing said coupling members in a fluid-tight manner.

4. The coupling of claim 3 wherein said offset portion includes a plurality of apertures therein extending circumferentially of said offset portion; and set screw means disposed in said offset portion apertures adapted to engage said annular ring and thus secure said annular ring to said offset portion.

5. The coupling of claim 1 wherein said split ring portions comprise a pair of interlocking half-rings partially encircling said first coupling member, one of said half-rings having a first generally horizontally extending portion with a generally vertically downwardly extending lip portion at its outer end and the other of said half-rings having a first generally horizontally extending portion with a generally vertically upwardly extending lip portion at its outer end, each of said lip portions interlocking in a manner preventing lateral movement of said half-rings but permitting vertical disengagement thereof.

6. The coupling of claim 1 wherein said frangible securing means includes a plurality of frangible bolts securing said flange portions together.

7. The coupling of claim 6 wherein each of said frangible bolts include a reduced diameter shank portion.

8. The coupling of claim 7 wherein said bearing means on said lower flange portion engages said bearing ring on said first coupling member in a manner forming a space between said upper coupling member and said lower flange portion.

9. The coupling of claim 8 wherein said bolts are threaded at both ends;
threaded nuts threaded on one end of each of said bolts and abutting against the upper face of said upper flange portion; and
second threaded nuts threaded on the other end of each of said bolts, said second nuts being disposed in an annular cavity formed in the lower flange portion and thus securing said lower flange portion to said upper flange portion.

* * * * *